United States Patent [19]

Iwasaki

[11] Patent Number: 4,553,058
[45] Date of Patent: Nov. 12, 1985

[54] LOW PROFILE DIRECT CURRENT MOTOR

[75] Inventor: Shinichiro Iwasaki, Troy, Mich.

[73] Assignee: Aisin Seiki Kabushiki Kaisha, Kariya, Japan

[21] Appl. No.: 595,483

[22] Filed: Mar. 30, 1984

[51] Int. Cl.$^4$ .......................................... H02K 23/54
[52] U.S. Cl. ..................................... 310/268; 29/598; 310/154
[58] Field of Search ............. 310/40 MM, 42, 44, 49, 310/187, 208, 154, 214, 268, 181, 233–235, 156; 29/598

[56] References Cited

U.S. PATENT DOCUMENTS

| | | | |
|---|---|---|---|
| 1,947,269 | 2/1934 | Leibing | 171/252 |
| 2,683,232 | 9/1950 | Weissheimer | 310/268 |
| 2,853,637 | 9/1958 | Ishikawa | 310/268 |
| 2,885,645 | 5/1951 | Wennerberg | 310/44 |
| 3,315,106 | 3/1964 | Reynst | 310/268 |
| 3,348,086 | 11/1964 | Monma | 310/268 |
| 3,845,338 | 10/1974 | Fawzy | 310/154 |
| 4,152,614 | 5/1979 | Noguchi et al. | 310/40 MM |
| 4,243,902 | 1/1981 | Ban et al. | 310/154 |
| 4,379,257 | 4/1983 | Hore | 310/49 R |

FOREIGN PATENT DOCUMENTS 140109 10/1979 Japan ........................... 310/40 MM
115166 10/1981 Japan ................................. 310/268

OTHER PUBLICATIONS

Eshback et al., *Handbook of Engineering Fundamentals,* pp. 905–906.

*Primary Examiner*—Peter S. Wong
*Assistant Examiner*—D. L. Rebsch
*Attorney, Agent, or Firm*—Banner, Birch, McKie & Beckett

[57] ABSTRACT

A low profile electric motor has a disk-shape armature with front and rear faces. Each face has a plurality of armature windings, the turns of each winding extending across each face from one point on the periphery of the armature inwardly across the face to a point adjacent the center of the face and outwardly to another point on the periphery. The novel arrangement of the windings maximizes the number of turns that are cut by the magnetic flux generated by the motor field magnetics, and thus increases the torque produced by the motor. The rotor is not penetrated by the shaft, in one embodiment.

9 Claims, 11 Drawing Figures

LOW PROFILE DIRECT CURRENT MOTOR

BACKGROUND OF THE INVENTION

The present invention relates generally to the field of electric motors, and more particularly, is directed to a low profile direct current electric motor which may be used in restricted space areas.

Low profile or so-called "pancake" motors are used in a wide variety of applications. Many of these applications demand a motor that is both small in size and is capable of delivering high output torque. For example, such motors are often installed in the door panels of automobiles for operating a power window system. In modern automobiles, however, door panels are becoming increasingly thinner. Thus, any devices installed in the door panel must be correspondingly thinner. Low profile motors known in the prior art that were at one time suitable for this application are fast becoming fewer in number.

One embodiment of a conventional low profile or pancake motor comprises a disk-shaped armature having so-called printed circuits. The printed circuits form a winding with a limited number of turns. Because the number of turns in each winding is limited, the magnetic flux generated by the windings is correspondingly low. Thus, the output torque of the motor is very small. Moreover, the limited number of turns in the windings result in a motor having a very low impedance. Thus, such motors are suitable only for low voltage operation. The armature of the motor also includes a hole for the motor shaft. Such a hole reduces the flux area of the armature and thus the available torque of the motor.

U.S. Pat. No. 3,315,106 issued in the name of Reynst discloses a pancake motor design which addresses some of the deficiencies in pancake motors known in the prior art. The Reynst motor comprises an armature having windings with a relatively large number of turns. The windings are wound through slots in the armature to increase the number of turns in each winding. Thus, the motor can produce more torque than motors known in the prior art. In the manufacture of such a motor, however, substantial time and care is required in placing the windings in the slots. Thus, mass production of motors of this design is not economical. Moreover, the armature has a relatively large hole for the motor shaft, thus reducing the flux area of the armature and its available torque.

SUMMARY OF THE INVENTION

It is the overall object of the present invention to provide a new and improved motor which overcomes the disadvantages of motors known in the prior art.

A specific object of the present invention is to provide a new and improved motor having a novel armature winding arrangement which can be readily manufactured.

Another specific object of the present invention is to provide a new and improved motor having a novel armature winding arrangement wherein a substantial number of the magnetic lines of flux generated by the motor field magnets cut across a substantial number of the turns forming the armature windings.

Another specific object of the present invention is to provide a new and improved motor which is lower in profile compared to such motors known in the prior art.

A further specific object of the present invention is to provide a new and improved motor which is lower in profile than motors known in the prior art without a corresponding reduction in output torque.

A still further specific object of the present invention is to provide a new and improved motor which can be readily manufactured.

Another specific object of the present invention is to provide a new and improved motor which is highly efficient, reliable and low in cost.

The low profile motor in accordance with the present invention comprises a disk-shaped armature of soft magnetic material. A plurality of windings are wound around the armature along its front and rear faces. In one embodiment of the invention, a small hole is provided in the center of the armature for receiving a shaft. In this embodiment, the turns in each winding extend across each armature face substantially adjacent, i.e., substantially contiguous, the center of the armature where the hole is located. No slots are provided in the armature for the windings to extend through as is known in the prior art nor do the windings extend through the small hole used to receive the armature shaft. Thus, the windings may be readily formed on the armature using very simple manufacturing techniques. The motor in accordance with the present invention further includes front and rear plates each having a pair of arc-shaped magnetic poles of opposite polarity forming field magnets and a centrally located hole for receiving the armature shaft. The plates are mounted on the shaft in spaced parallel position, with the armature therebetween, and arranged to provide a flow of magnetic flux perpendicular to the windings on the front and rear faces of the armature. The novel arrangement of the windings on the armature assure that a substantial number of the magnetic lines of flux generated by the motor field magnets cut across a substantial number of the turns forming the armature windings along both the front and rear faces of the armature. A commutator is mounted on one end of the shaft to provide electrical power to the armature windings in cooperation with a pair of brushes.

In the low profile motor of the present invention, only the motor shaft is received in the hole formed in the armature. Thus, the hole need be formed no larger than the diameter of the shaft. It has been discovered that minimizing the size of the hole in the armature increases the flux area of the armature, which also increases the output torque of the motor. A corresponding benefit is that the motor can be made even smaller. Moreover, a larger number of turns in each winding is possible since more surface area is available on the armature. Thus, a corresponding increase in motor torque is realized.

In some applications, the driving torque required by the driven device necessitates the use of a large motor shaft. A large shaft, however, requires a correspondingly large hole in the armature. Such a hole decreases the flux area of the armature and reduces the number of turns possible in each winding as pointed out above. The second embodiment of the present invention is ideally suited for those applications requiring a large motor shaft.

In the second embodiment of the present invention, the armature does not have a hole for receiving a shaft. The turns of each winding on the armature are wound over the center of the armature and extend directly accoss its front and rear faces. Thus, the windings for the armature in this embodiment may also be formed using simple manufacturing techniques. First and second shaft assemblies are connected to the armature windings at the center of each respective face of the armature. A resin enclosure is then molded over the entire armature assembly to form a composite unit, with shaft assemblies extending through each respective side of the enclosure. The molded enclosure provides added strength for the assembly. The shaft portion of each shaft assembly can thus be made to correspond in size to the required torque of the motor without deleteriously effecting the number of turns in the armature winding or the flux area of the armature.

This embodiment of the present invention also includes front and rear plates each having a pair of arc-shaped magnetic poles of opposite polarity and a centrally located hole for receiving a respective armature shaft assembly. The plates are mounted on the shaft assemblies in spaced, parallel position and arranged to provide a flow of magnetic flux perpendicular to the front and rear faces of the armature. A commutator is also provided on one of the shaft assemblies to provide electrical power to the armature windings in cooperation with a set of brushes.

DESCRIPTION OF THE PREFERRED EMBODIMENT

Figure 1:
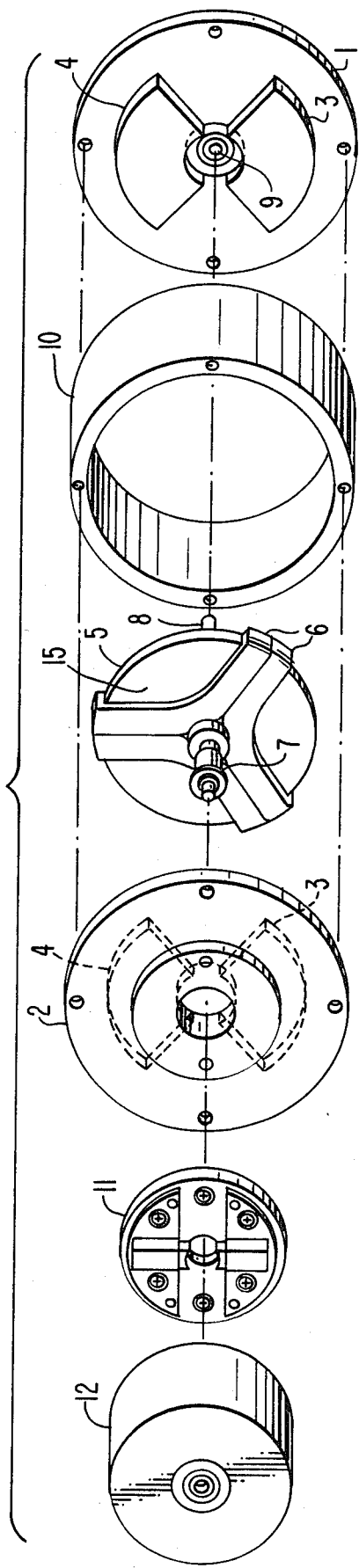
FIG. 1 is an assembly view of a motor in accordance with the present invention.
Figure 2:
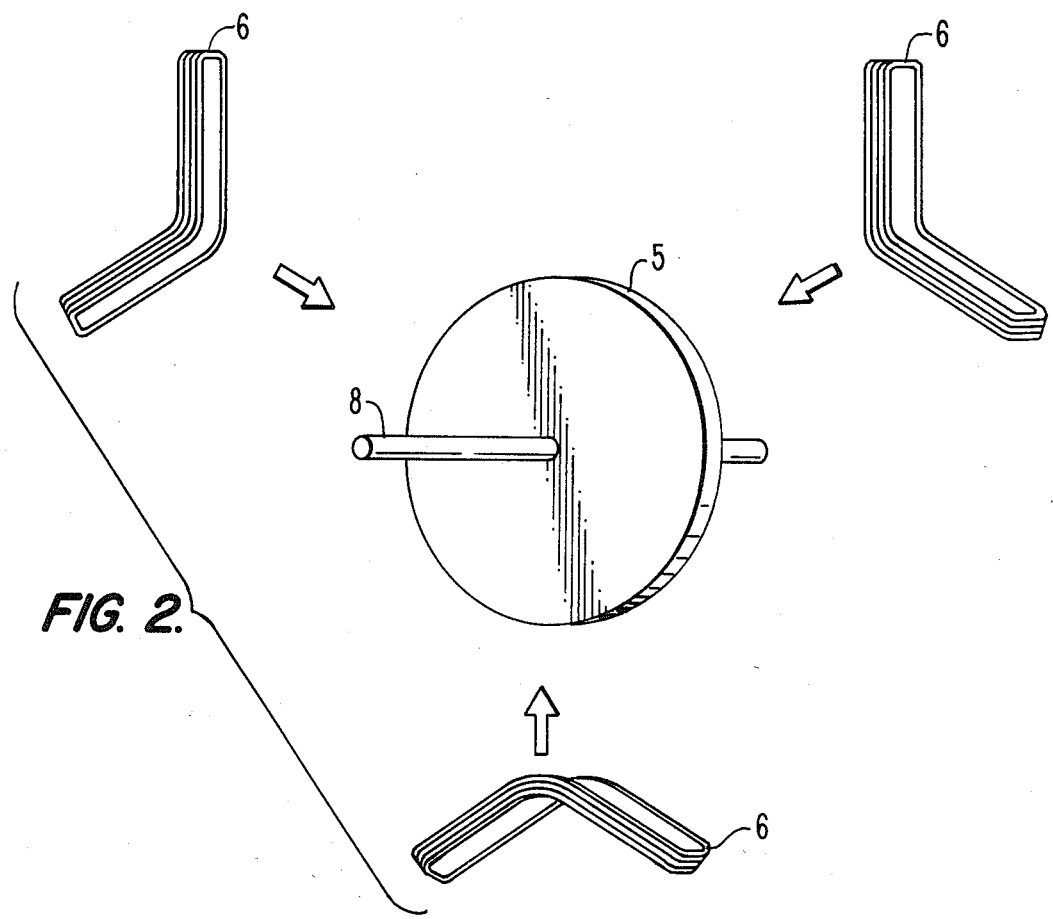
FIG. 2 is an assembly view illustrating the armature and armature windings of the motor shown in FIG. 1.

One embodiment of a motor in accordance with the present invention is shown in FIG. 1. This embodiment comprises a number of inter-related elements including disk-shaped armature 5 having a plurality of windings 6 and a shaft 8. Armature 5 is illustrated in additional detail in FIG. 2 where shaft 8 is shown located through a small hole in armature 5 and windings 6 are shown in their respective assembly positions along the faces of armature 5. With reference again to FIG. 1, windings 6 extend across front face 15 and rear face 16 of armature 5. Each turn of the windings extends from one point on the periphery of the armature inwardly across a respective face to a point substantially adjacent, i.e., substantially contiguous, the center of the face and outwardly to another point on the periphery of the armature. Because the windings are formed along the front and rear faces of the armature, they are fully exposed and may be readily fabricated using relatively simple manufacturing techniques and production processes. Both the front and rear faces of the armature may comprise an equal number of windings. The arrangement of the windings in this manner maximizes the active portions of the armature which cut across the lines of magnetic flux generated by magnetic poles 3 and 4 described below. Thus, the amount of torque produced by the motor is maximized. As further shown in FIG. 1, this embodiment of the present invention also includes plates 1 and 2. Plates 1 and 2 each have a pair of arcshaped magnetic poles forming a magnetic field and center hole 9 for receiving shaft 8. Plates 1 and 2 are mounted on shaft 8 in spaced parallel position, with armature 5 between, and providing a flow of magnetic flux perpendicular to the front and rear faces of armature 5. Plates 1 and 2 are held in spaced parallel position by cover 10. Shaft 8 includes commutator 7 which extends through plate 2 to brush assembly 11. Brush assembly 11 and commutator 7 cooperate to selectively provide electrical power to windings 6 on armature 5. Housing 12 is provided as a cover for brush assembly 11.

Figure 4:
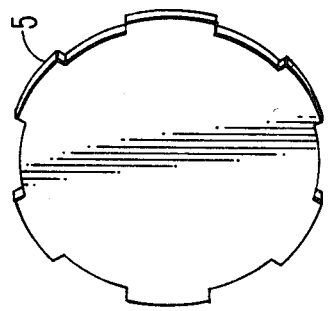
FIG. 4 is a perspective view of one embodiment of an armature having a slotted periphery in accordance with the present invention.

FIG. 4 illustrates an embodiment of armature 5 having a slotted periphery. The slots are provided for receiving windings 6. Thus, the diameter of armature 5 may be reduced to provide even more compactness for the motor.

Figure 6:
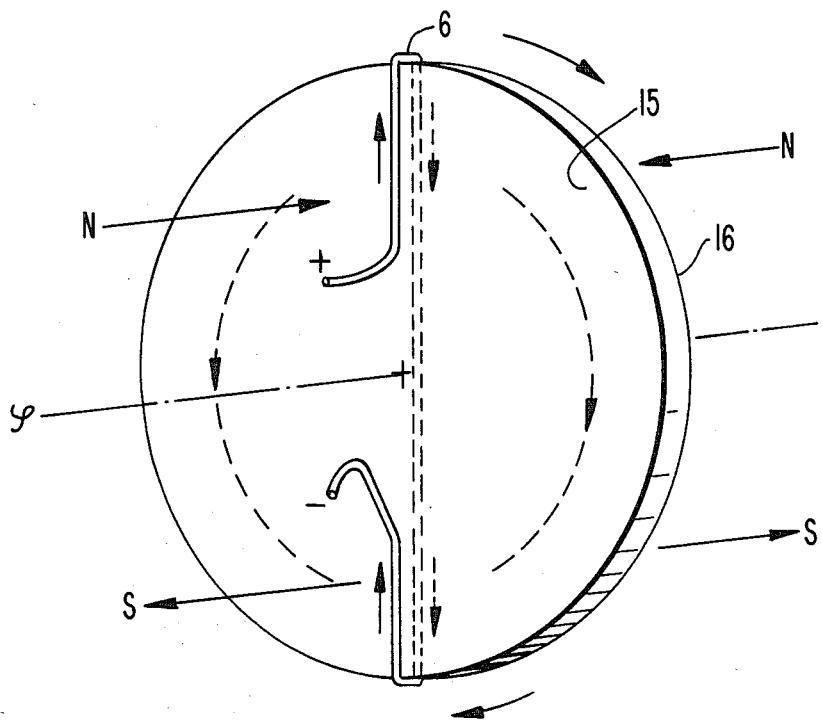
FIG. 6 is a diagram illustrating the flow of magnetic lines of flux across the armature windings.

FIG. 6 illustrates the flow of magnetic lines of flux from magentic poles 3 and 4 mounted on plates 1 and 2. As shown in FIG. 6, the flow of the magnetic lines of flux is perpendicular to each respective face of armature 5. Thus, armature windings 6 cut across the maximum number of flux lines as armature 5 rotates, and high torque can be produced by the motor.

Figure 12:
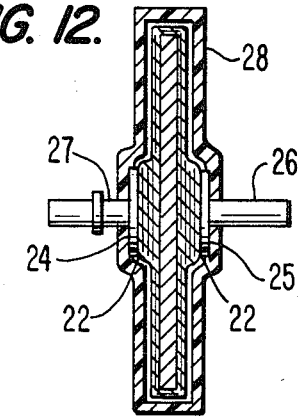
FIG. 12 is a section view along line 12—12 in FIG. 7.
Figure 7:
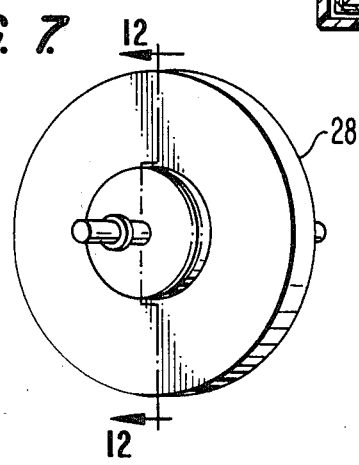
FIG. 7 is a perspective view illustrating an armature having a molded resin enclosure in accordance with the present invention.
Figure 8:
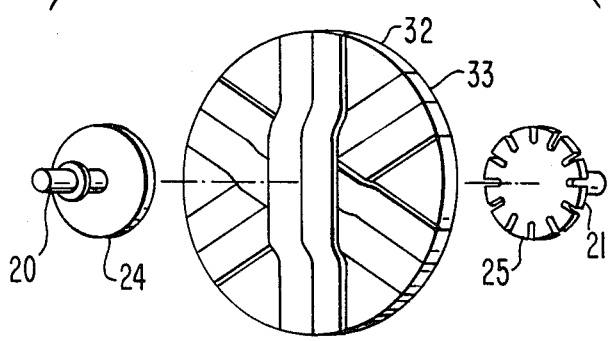
FIG. 8 is an assembly view illustrating an armature and armature windings and respective shaft assemblies in accordance with the present invention.

FIGS. 7 and 8 illustrates an alternative construction for the motor armature. In this embodiment, armature 32 does not have a hole for receiving a shaft. As shown in FIG. 8, armature 32 comprises a plurality of windings 33 wound across the center the armature. Shaft assemblies 20 and 21 are rigidly connected to the windings on each respective surface of armature 32 by an adhesive 22 as shown in FIG. 12. Enclosure 28 is then molded over the entire assembly. It is anticipated that enclosure 28 will be a high strength molding resin compound which provides additional shear strength for armature assemblies 20 and 21. In this emodiment of the invention, windings 33 may also be readily wound on armature 32 because they are not formed through slots or holes in the armature.

Figure 5:
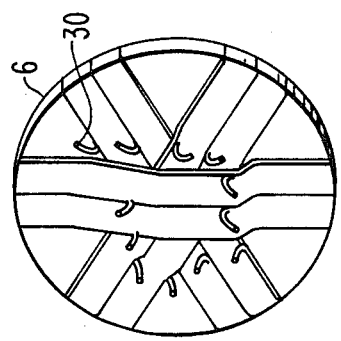
FIG. 5 is a perspective view of another embodiment of the armature and armature windings in accordance with the present invention.

As shown in FIG. 5, each winding 33 terminates in respective ends 30. These ends may be guided by wire guide 24 on shaft assembly 21 to a commutator, e.g., commutator 7 shown in FIG. 1.

Figure 3:
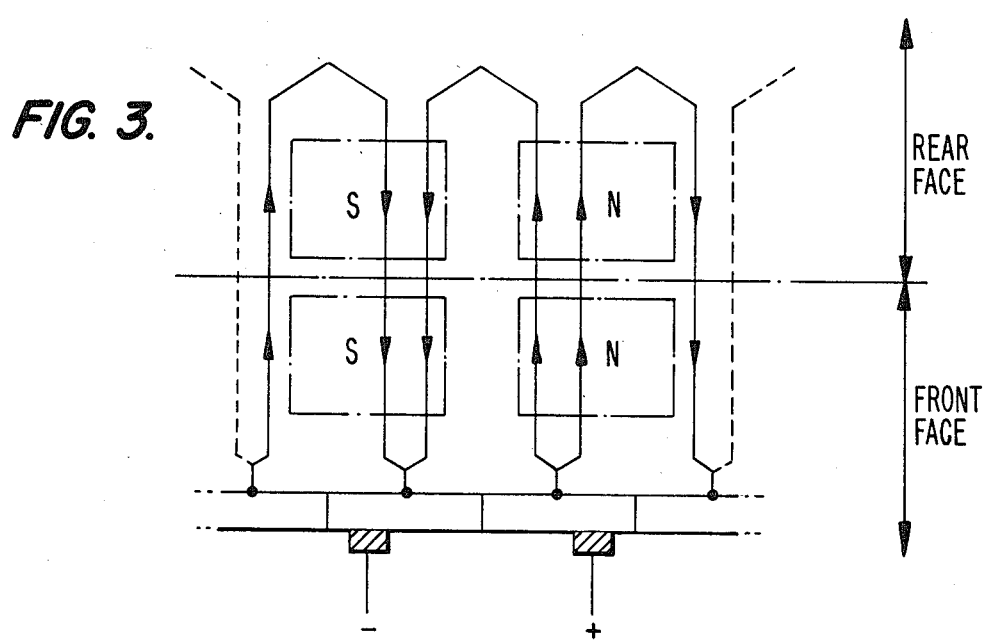
FIG. 3 is a wiring diagram illustrating one wiring scheme for the armature windings.
Figure 9:
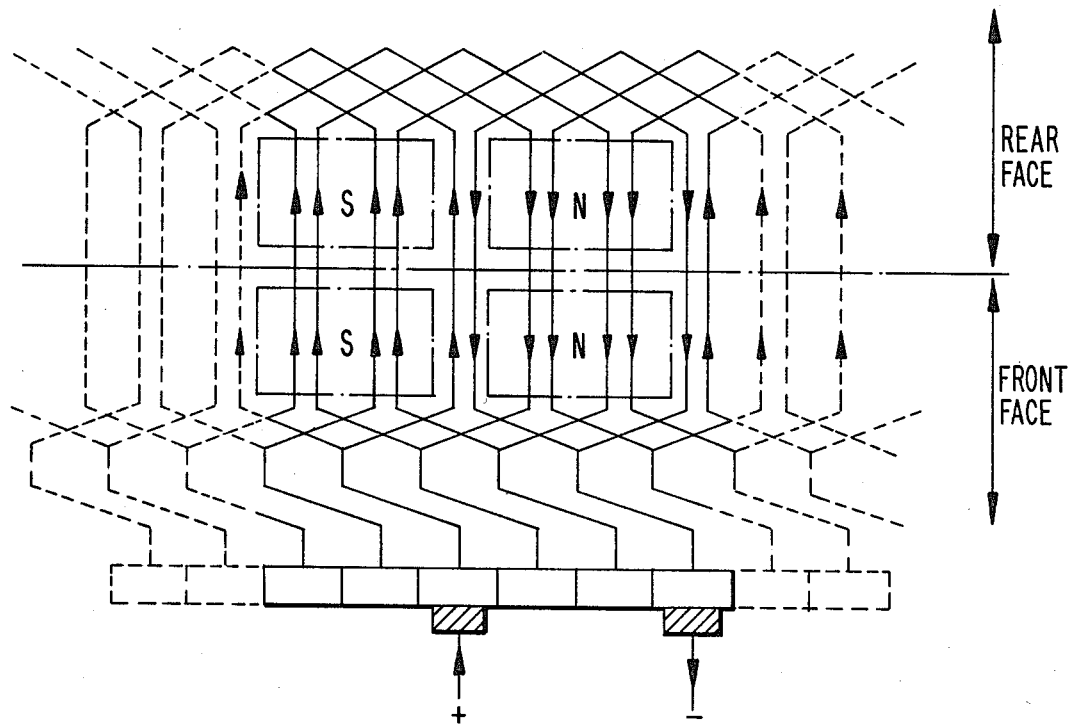
FIG. 9 is a wiring diagram illustrating another wiring scheme for the armature windings.

FIGS. 3 and 9 illustrate various wiring schemes which may be used to connect the armature windings as known in the prior art. The choice of a particular wiring scheme is dependent on the application that the motor will be used for and the power source. The wiring scheme shown in FIG. 3 is particularly suited for the embodiment of the armature shown in FIGS. 1 and 2 and the wiring scheme shown in FIG. 9 is particularly suited for the embodiment shown in FIGS. 5 and 8.

Figure 10:
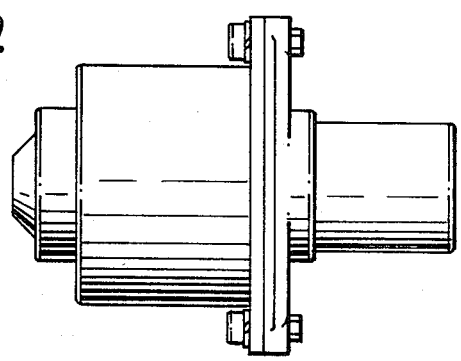
FIGS. 10 and 11 provide a comparison between the size of a prior art low profile motor shown in FIG. 11 and a much smaller low profile motor in accordance with the present invention having the same torque.
Figure 11:
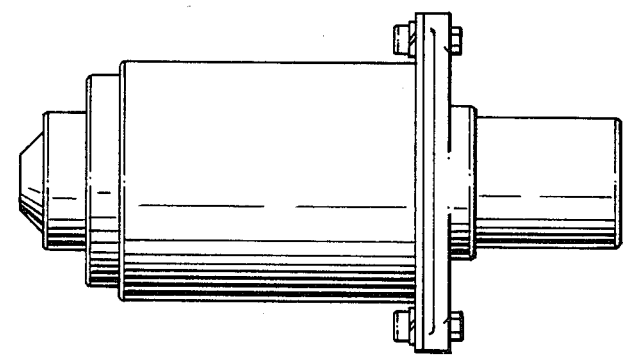

FIGS. 10 and 11 provide a size comparison between a low profile motor in accordance with the present invention as shown in FIG. 10 and a so-called low profile motor known in the prior art as shown in FIG. 11. These motors produce the same level of output torque.

Obviously, many modifications and variations of the abovedescribed preferred embodiment will become apparent to those skilled in the art from a reading of this disclosure. It should be realized that the invention is not limited to the particular apparatus disclosed, but its scope is intended to be governed only by the scope of the appended claims.

I claim:

1. A low profile electric motor, said motor comprising:
    an armature having a disk-shaped core with front and rear faces, each of said faces having a plurality of armature windings in physical contact with said armature, each turn of said windings being wound along said front and rear faces and terminating in first and second free ends, each turn extending across each face from one point on the periphery inwardly across the face to a point adjacent the center of the face and outwardly to another point on the periphery;
    an armature shaft rigidly received through a hole formed in the center of said armature;
    front and rear plates each having a pair of arc-shaped magnetic poles of opposite polarity and a centrally located hole for receiving said armature shaft, said plates being mounted on said shaft in spaced parallel position with said armature therebetween and arranged to provide a flow of magnetic flux perpendicular to said front and rear faces;
    commutator means positioned on said shaft adjacent one of said plates and operatively connected to said first and second free ends for intermittently supplying a power source to a selected one of said windings; and
    brush means operatively coupled to said commutator means for connecting said power source to said commutator.

2. The electric motor of claim 1 wherein said windings substantially occupy a 120° segment of said armature.

3. The electric motor of claim 1 wherein said armature comprises a plurality of slots along its periphery, said windings being received in said slots.

4. The electric motor of claim 1 further comprising a housing, said housing maintaining said front and rear plates in spaced parallel position.

5. The electric motor of claim 1 wherein said armature comprises a soft magnetic material.

6. A low profile electric motor, said motor comprising:
    an armature having a disk-shaped core with front and rear faces, each of said faces having a plurality of armature windings in physical contact with said armature, each turn of said windings being wound along said front and rear faces and terminating in first and second free ends, each turn extending across each face over the cental portion of the face;
    a first shaft assembly centrally located with respect to said armature and rigidly connected to said windings along said rear side;
    a molded enclosure covering said armature and said windings, said first and second shaft assemblies extending through respective sides of said enclosure, said first and second free ends extending through one side of said enclosure;
    front and rear plates each having a pair of arc-shaped magnetic poles of opposite polarity, said plates being mounted on said first and second shaft assemblies, respectively, in spaced parallel position with said armature carrying said covering therebetween and arranged to provide a flow of magnetic flux perpendicular to said front and rear faces;
    commutator means positioned on one of said shaft assemblies and operatively connected to said first and second free ends for intermittently supplying a power source to a selected one of said windings; and
    brush means operatively coupled to said commutator means for connecting said power source to said commutator.

7. The electric motor of claim 6 wherein said armature comprises a plurality of slots along its periphery, said windings being received in said slots.

8. The electric motor of claim 6 further comprising a housing, said housing maintaining said front and rear plates in spaced parallel position.

9. The electric motor of claim 6 wherein one of said shaft assemblies comprises guide means for guiding said first and second free ends to said commutator.

* * * * *